United States Patent
Wang et al.

(10) Patent No.: US 9,333,597 B2
(45) Date of Patent: May 10, 2016

(54) NITRIDED COMPONENT SURFACE REPAIR WITH AUTOFRETTAGE

(71) Applicant: CATERPILLAR INC., Peoria, IL (US)

(72) Inventors: Huijun Wang, Peoria, IL (US); Marion B. Grant, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/625,273

(22) Filed: Feb. 18, 2015

(65) Prior Publication Data

US 2015/0158131 A1 Jun. 11, 2015

Related U.S. Application Data

(63) Continuation-in-part of application No. 13/795,044, filed on Mar. 12, 2013, now Pat. No. 8,986,817.

(51) Int. Cl.

| | |
|---|---|
| B32B 3/02 | (2006.01) |
| B23P 9/00 | (2006.01) |
| C23C 18/16 | (2006.01) |
| F02M 59/44 | (2006.01) |
| C23C 18/36 | (2006.01) |
| F02M 59/48 | (2006.01) |
| F02M 57/02 | (2006.01) |
| F02M 59/02 | (2006.01) |
| F02M 59/10 | (2006.01) |
| F04B 53/00 | (2006.01) |
| C21D 7/00 | (2006.01) |
| C23C 18/18 | (2006.01) |
| C23C 18/32 | (2006.01) |

(52) U.S. Cl.
CPC ... *B23P 9/00* (2013.01); *C21D 7/00* (2013.01); *C23C 18/1639* (2013.01); *C23C 18/1689* (2013.01); *C23C 18/36* (2013.01); *F02M 57/025* (2013.01); *F02M 59/025* (2013.01); *F02M 59/102* (2013.01); *F02M 59/44* (2013.01); *F02M 59/48* (2013.01); *F04B 53/00* (2013.01); *C23C 18/1605* (2013.01); *C23C 18/1803* (2013.01); *C23C 18/1806* (2013.01); *C23C 18/32* (2013.01); *F02M 2200/80* (2013.01); *F02M 2200/9038* (2013.01); *Y10T 428/24802* (2015.01)

(58) Field of Classification Search
CPC .. C21D 7/00; Y10T 428/24802; C23C 18/32; C23C 18/36; C23C 18/1633; C23C 18/1689; C23C 18/1692
See application file for complete search history.

(56) References Cited

U.S. PATENT DOCUMENTS

| | | | |
|---|---|---|---|
| 4,358,922 | A | 11/1982 | Feldstein |
| 4,636,255 | A | 1/1987 | Tauda et al. |
| 8,381,402 | B2 | 2/2013 | Grant et al. |
| 2002/0045053 | A1 | 4/2002 | Hoskin |
| 2011/0206532 | A1 | 8/2011 | Sorbo et al. |

FOREIGN PATENT DOCUMENTS

JP   2011-174181   9/2011

*Primary Examiner* — Elizabeth Mulvaney
(74) *Attorney, Agent, or Firm* — Finnegan, Henderson, Farabow, Garrett & Dunner, LLP (57) ABSTRACT

A method for repairing a nitrided surface having a damaged area is disclosed. The method includes introducing the nitrided surface into a bath containing electroless material for a predetermined period of time. The method also includes coating the damaged area with a layer of the electroless material. Further the method subjects the layer to an autofrettage process. The electroless material is heat treated at a predetermined temperature for a predefined time.

20 Claims, 7 Drawing Sheets

NITRIDED COMPONENT SURFACE REPAIR WITH AUTOFRETTAGE

RELATED APPLICATIONS

This application is a continuation-in-part application of U.S. application Ser. No. 13/795,044 filed Mar. 12, 2013, the contents of which are expressly incorporated herein by reference.

TECHNICAL FIELD

The present disclosure relates to a method of nitride component surface repair and more particularly to method of nitride component surface repair with autofrettage.

BACKGROUND

Electroless metal coatings on machine components for enhanced performance are known in the art. The electroless coating process is typically used for enriching the surface of metallic components for protection against corrosion, wear, etc. For example, U.S. Published Application No. 2011/206532 relates to an electroless coating process including coating a substrate with an electroless coating and then heating to a specific temperature.

Some engines are assembled with surface hardened components. A nitriding process is widely used for surface hardening of the components. The nitriding process is a heat treatment process that diffuses nitrogen into the surface of the metallic component to create a case hardened surface. The component may be made from steel, iron, titanium, and the like. The component that is subjected to the nitriding process may already be in a hardened and tempered condition. This may allow for the nitriding process to take place at a temperature lower than the last tempering temperature. Further surface treatment, such as, for example, coating or cladding, may be conducted at a lower temperature than that of the nitriding temperature, in order to avoid damaging of the nitride hardened layer.

During operation, the nitrided surface of the component may be subjected to wear, cavitation, erosion, tear, corrosion, or other damage. The damage may be due to the application of higher force, surface strain, torsion, bending moment, or other environmental conditions. Damage to the nitrided surface may result in unsatisfactory performance, sometimes requiring replacement of the parts with new components. This may lead to an overall increase in costs.

Various methods for repairing these damaged components are known in the art. For example, micro arc welding and laser beam cladding can be used for coating a material on the nitrided surface. However, these techniques are thermal based repair processes that may damage a base material strength of the nitrided surface. High temperatures involved in thermal based repair processes can lead to out-gassing of nitrogen from the nitrided surface, causing a reduction in the hardness of the nitrided surface. The out-gassing of nitrogen may also lead to porosity issues in the coated material.

Other known techniques include chrome plating and High Velocity Fuel Oxygen (HVOF). However, the chrome plating technique is not environment friendly. In the HVOF method, bonding between the coated material and the nitrided surface is not metallurgical, thus affecting the bond strength.

Hence, there is a need of providing an improved method of repair for nitrided components.

SUMMARY

In one aspect of the disclosure, a method for repairing a nitrided surface having a damaged area is disclosed. The method includes introducing the nitrided surface into a bath containing electroless material for a predetermined period of time. The method also includes coating the damaged area with a layer of the electroless material. The method further includes performing an autofrettage process on the layer. In addition, the method includes heat treating the electroless material at a predetermined temperature for a predefined time.

In another aspect of the disclosure, a plunger for a fuel injection assembly is disclosed. The plunger includes an outer nitrided surface having a first hardness. The outer nitride surface includes at least one damaged area. An electroless material is coated on the damaged area. The electroless material has a second hardness different from the first hardness. The electroless material is subjected to an autofrettage process.

DETAILED DESCRIPTION

Reference will now be made in detail to specific embodiments or features, examples of which are illustrated in the accompanying drawings. Generally, corresponding or similar reference numbers will be used, when possible, to refer to the same or corresponding parts.

Figure 1:
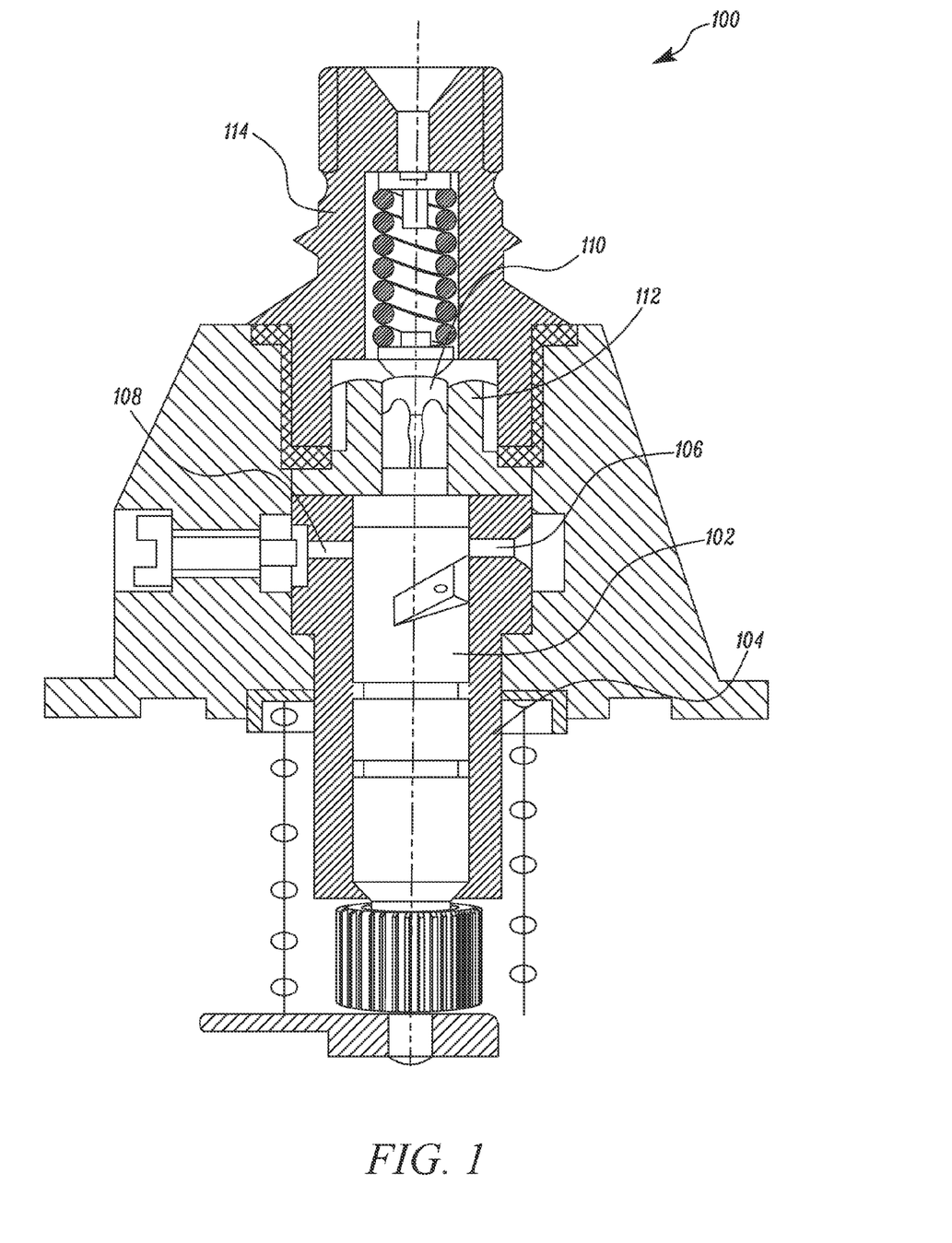
FIG. 1 is a sectional view of an exemplary fuel injection assembly having a plunger, according to one embodiment of the present disclosure.

Referring now to FIG. 1 an exemplary fuel injection assembly 100 of a diesel engine is illustrated. The fuel injection assembly 100 may include a plunger 102 slidably and rotatably placed in a barrel 104. The barrel 104 may be configured to have an inlet port 106 and a spill port 108. The plunger 102 may be configured to rotate and slide in the barrel 104, in order to effectuate substantial delivery of pressurized fuel into a cylinder of the diesel engine at a predetermined time.

During operation of fuel injection assembly 100, the barrel 104 may receive a substantial quantity of fuel through the inlet port 106. Thereafter, the plunger 102 may compress the fuel in the barrel 104 in order to increase the pressure of the fuel. The high pressure fuel from the barrel 104 may then be introduced into a connector portion 114 through a delivery valve 110. The delivery valve 110 is located within an outlet portion 112 of the fuel injection assembly 100. Further, the connector portion 114 may deliver the high pressure fuel to an injector (not shown) in order to inject the fuel into the cylinder. The spill port 108 may be configured to provide the additional fuel in the barrel back to a fuel tank.

Figure 2:
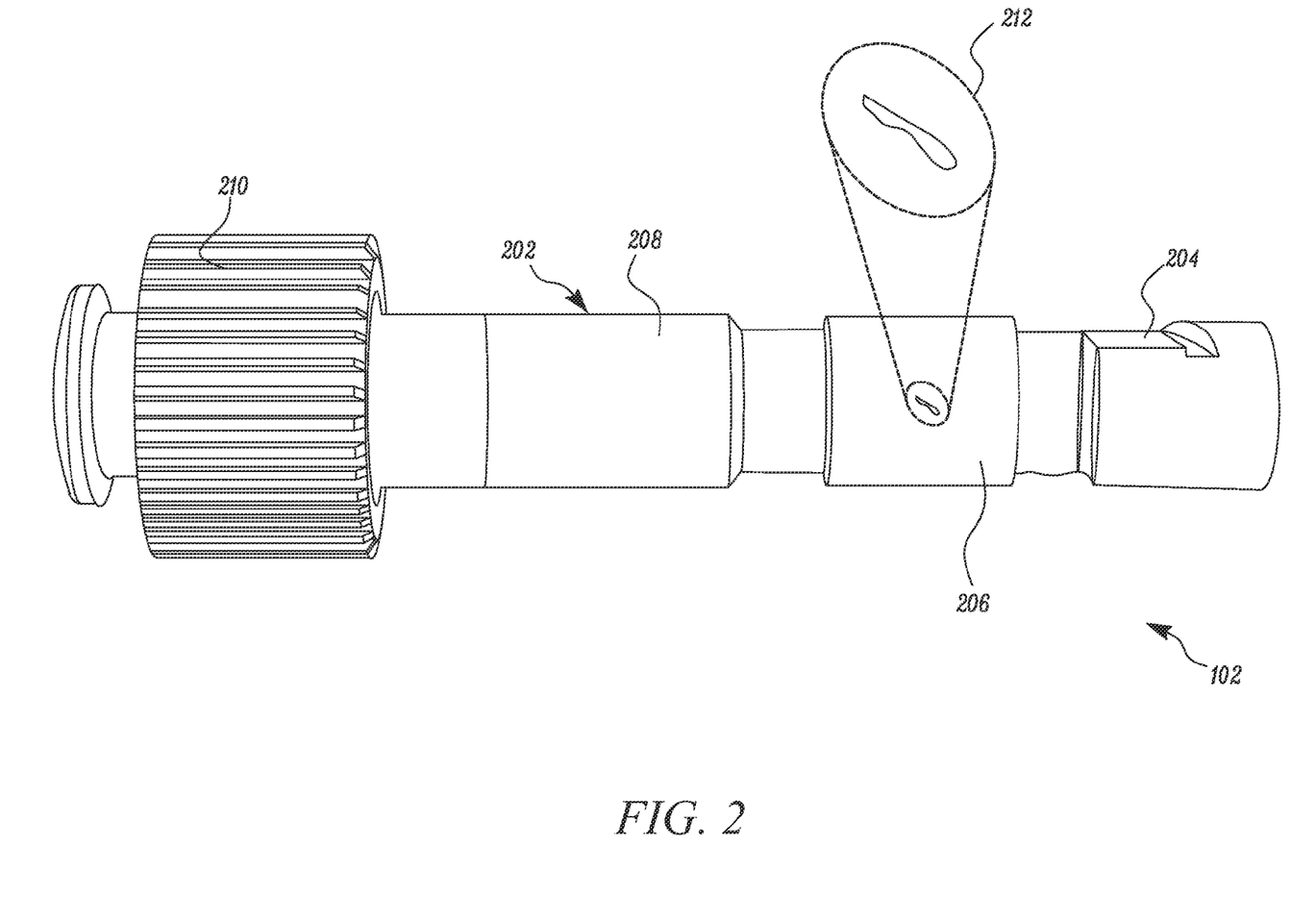
FIG. 2 is an isometric view of the plunger shown in FIG. 1, a damaged area clearly visible on a nitrided surface of the plunger.

FIG. 2 illustrates the plunger 102 utilized in the fuel injection assembly 100, according to various embodiments of the present disclosure. The plunger 102 has an outer surface 202 including an upper portion 204, a middle portion 206 and a lower portion 208. As illustrated in FIG. 1, the upper portion 204 may be in fluid communication with the fuel in the barrel 104 of the fuel injection assembly 100 for discharging a specific amount of fuel at a predetermined time. The middle portion 206 of the plunger 102 may be in contact with an inner wall of the barrel 104 of the fuel injection assembly 100. The lower portion 208 of the plunger 102 may include an integrated gear segment 210.

Figure 3:
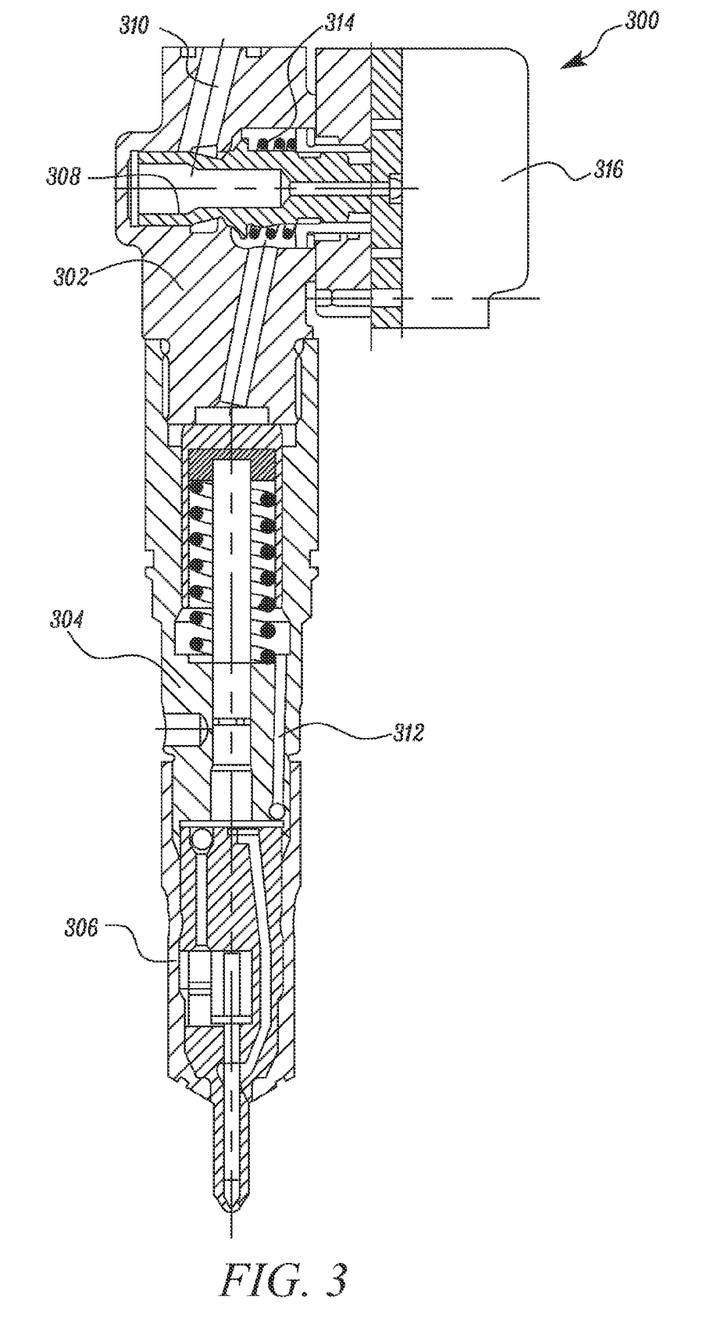
FIG. 3 is an sectional view of an exemplary fuel injector assembly having a poppet.
Figure 4:
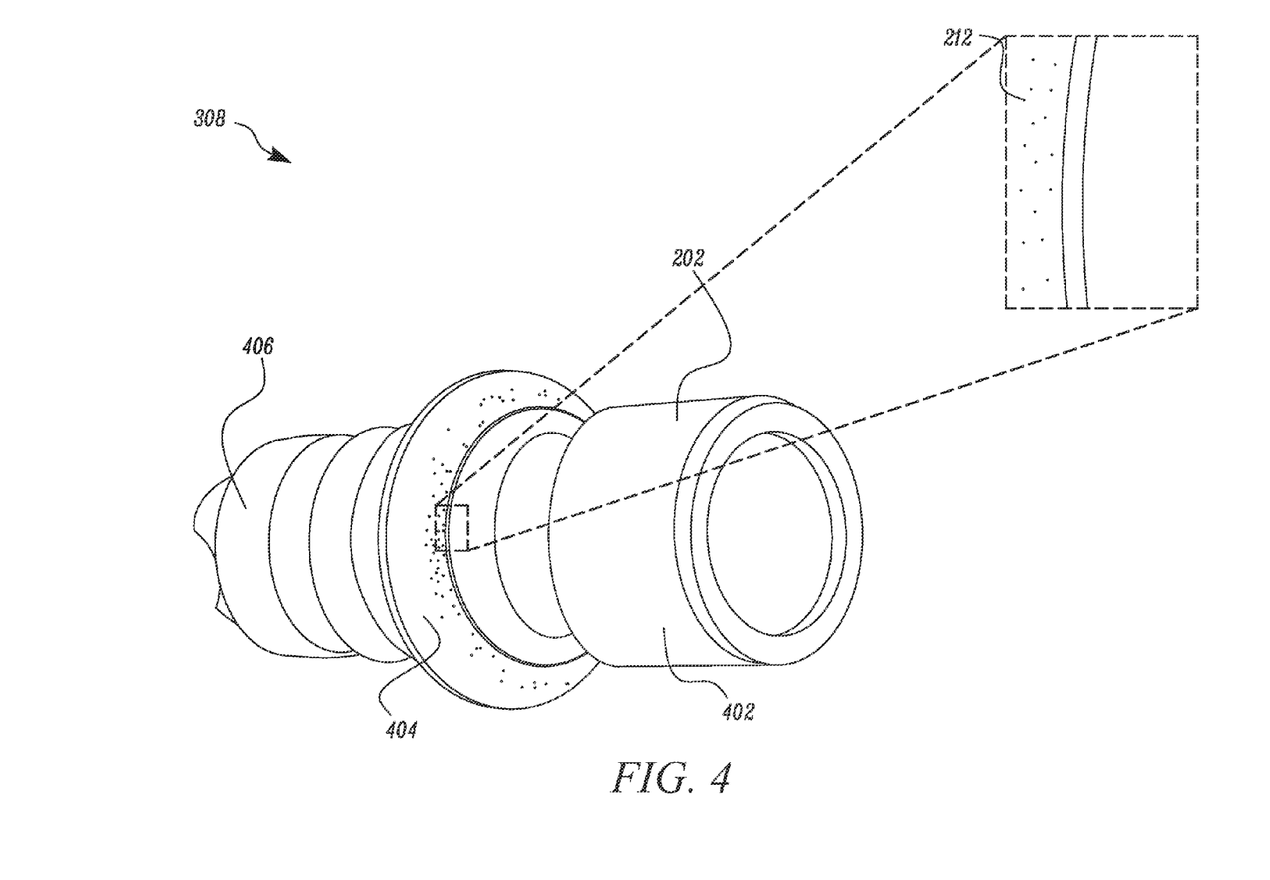
FIG. 4. is an isometric view of the poppet shown in FIG. 3, the damaged area clearly visible on the nitrided surface of the poppet.

Another exemplary machine component is depicted in FIGS. 3 and 4. FIG. 3 illustrates a fuel injector assembly 300 utilized in connection with the diesel engine. The fuel injector assembly 300 may include a first portion 302, an intermediate portion 304 and a nozzle portion 306. The first portion 302 may include a poppet 308 and a plurality of passages 310. The intermediate portion 304 may include a passage 312. The intermediate portion 304 may be connected to the first portion 302 and the nozzle portion 306.

During operation, the first portion 302 may receive the pressurized fuel from the fuel injection assembly 100. The first portion 302 of the fuel injector assembly 300 may then deliver the pressurized fuel to the nozzle portion 306 via the passages 312 located within the intermediate portion 304 and the passages 310 of the first portion 302. Thereafter, the nozzle portion 306 may inject the pressurized fuel in the cylinder of the diesel engine.

FIG. 4 illustrates the poppet 308 utilized in the fuel injector assembly 300. The poppet 308 has the outer surface 202 including an upper portion 402, a tapered middle portion 404, and a lower portion 406. As shown in FIG. 3, the upper portion 402 of the poppet 308 may be in contact with the passage 310 of the first portion 302. The tapered middle portion 404 at one end is contact with an internal wall of the first portion 302 and at other end is in contact with a spring 314 located within the first portion 302. Further, the lower portion 406 of the poppet 308 may be connected to an external cap 316 of the fuel injector assembly 300.

The plunger 102 and/or the poppet 308 may be made of a metal. In some embodiments the metal may include an alloy of steel, iron, or titanium. Other embodiments may include any metal known in the art. The outer surface 202 of the plunger 102 and/or the poppet 308 may be hardened by a surface treatment process, such as, but not limited to, a nitriding treatment process. The nitriding treatment process involves diffusing nitrogen into a base material at high temperatures. The high temperatures may include a range of 550-590° C. to provide the required surface hardness.

In one embodiment, during the operation of the fuel injection assembly 100, the plunger 102 may be damaged due to contact with other components in the fuel injection assembly 100. This damage on the nitrided surface 202 may be caused by a variety of factors including cavitation, erosion, corrosion, wear and tear, and/or higher forces. For example, the middle portion 206 of the plunger 102 may be damaged due to contact with the inner wall of the barrel 104 of the fuel injection assembly 100. In another example, increased fuel injection pressure within the barrel 104 may cause cavitation damage on the plunger 102. Usually, the cavitation damage is similar to scars, shown as the on the damaged area 212 in FIG. 2. The scar may have a depth of up to 150 micrometer.

During the operation of the fuel injector assembly 300, the poppet 308 may be exposed to damage due to contact with other components of the fuel injector assembly 300. For example, a surface of the tapered middle portion 404 of the poppet 308 may be damaged due to contact with the inner wall of the first portion 302. In another example, increased friction between the surface of the tapered middle portion 404 and inner wall of first portion 302 as well as abrupt changes in fuel pressure may cause cavitation and/or erosion damage on the poppet 308. The exemplary damaged area 212 on the poppet 308 is shown in the FIG. 4. As described earlier, the damaged area 212 on the nitrided surface 202 of the plunger 102 and/or the poppet 308 may include, for example, scratch marks, scars, deformations, abrasion marks, and erosion marks. A person of ordinary skill in the art will appreciate that the location, type and extent of damage described herein is exemplary.

The damaged area 212 on the nitrided surface 202 of the plunger 102 and/or poppet 308 may be repaired by coating damaged area 212 with an electroless material. The electroless material may include nickel (Ni), phosphorus (P), boron (B), or any combination thereof. For example, the electroless material may be a solution of nickel (Ni) with high phosphorus (P) content. One of ordinary skill in the art will appreciate that the electroless solution of nickel (Ni) with high phosphorus (P) content may result in a coated surface with a relatively higher surface hardness. In one exemplary embodiment, the coated surface may have a surface hardness that may be different from a surface hardness of the un-coated surface.

The coating of the electroless material on the nitrided surface 202 is configured to provide a surface hardness in a range of approximately 60-70 HRC. Known electroless Ni coating has plated hardness values in a range a range of approximately 49-62 HRC. These hardness values can be increased to approximately 64-70 HRC on heat treatment. It should be understood that surface hardness in the approximate range of approximately 60-70 HRC is desirable on the machine components, in order to provide protection from wear and tear that these components may undergo during operation.

Additionally, the coated surface may be subjected to an autofrettage process, which may alter the surface characteristics of the coated surface to make it more resistant to cavitation damage. An autofrettage process typically involves subjecting the coated surface to a large fluid pressure so that residual compressive stresses are introduced in the coated surface. Tensile forces introduced during operation of the component must first overcome the residual compressive stresses introduced in the coated surface before damage can be induced in the coated surface. To accomplish autofrettage, the coated surface may be subject to a fluid pressure for a predetermined duration of time to allow plastic deformation of the coated surface, which in turn induces compressive stresses on the coated surface.

Figure 5:
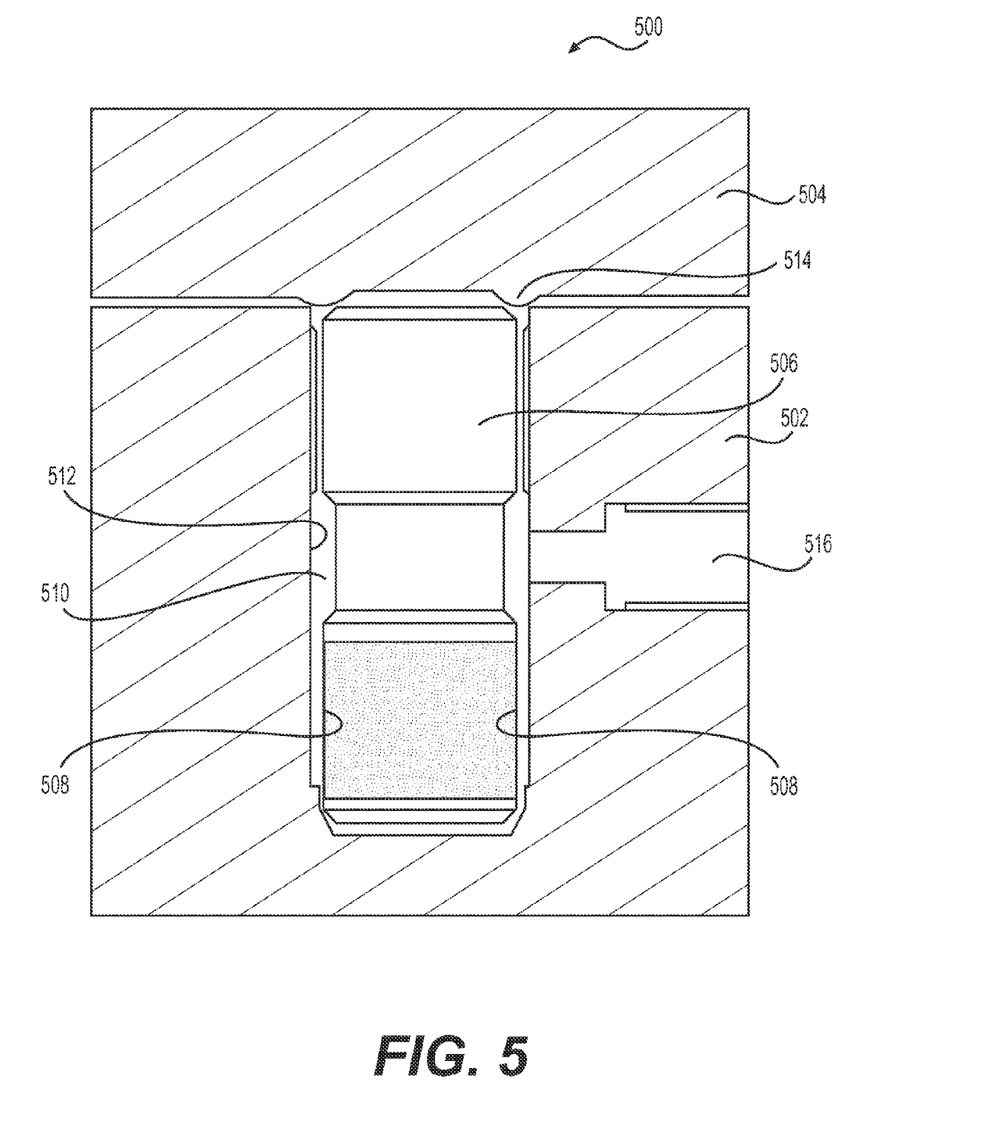
FIG. 5 is a pictorial view of an exemplary disclosed apparatus for performing autofrettage on the plunger of FIG. 2.

FIG. 5 illustrates a pictorial view of an exemplary autofrettage tooling setup 500 for performing autofrettage. As illustrated in FIG. 5, tooling setup 500 may include chamber 502 and cover 504. A component 506 with surfaces 508 coated with electroless material may be disposed within chamber 502. As illustrated in FIG. 5, component 506 may be disposed within chamber 502 so that a peripheral gap 510 may remain between surfaces 508 and walls 512 of chamber 502. Cover 504 may also include toroidal projection 514, which may help ensure a tight seal between cover 504 and chamber 502. Tooling setup 500 may also include passageway 516 for introducing autofrettage liquid into chamber 502. In use, pressurized autofrettage liquid may be introduced into chamber 502 via passageway 516. In one exemplary embodiment, a pressure of the autofrettage liquid may be about 150,000 psi (1 Giga pascal). The coated surfaces 508 of component 506 may be exposed to the high pressure for about 0.5 to 1.0 seconds. The pressurized liquid may then be slowly drained from chamber 502 via passageway 516. The high pressure applied by the autofrettage liquid on surfaces 508 may cause plastic deformation of surfaces 508, which may in turn induce residual compressive stresses in surfaces 508. It is also contemplated that the pressure exerted by the autofrettage liquid may press some of the electroless material coated on surfaces 506 into the base material lying below surfaces 506. In one exemplary embodiment, the autofrettage pressure may push the electroless coating into the base material to a depth ranging from about 0.5 micron to about 1.5 micron.

Figure 6:
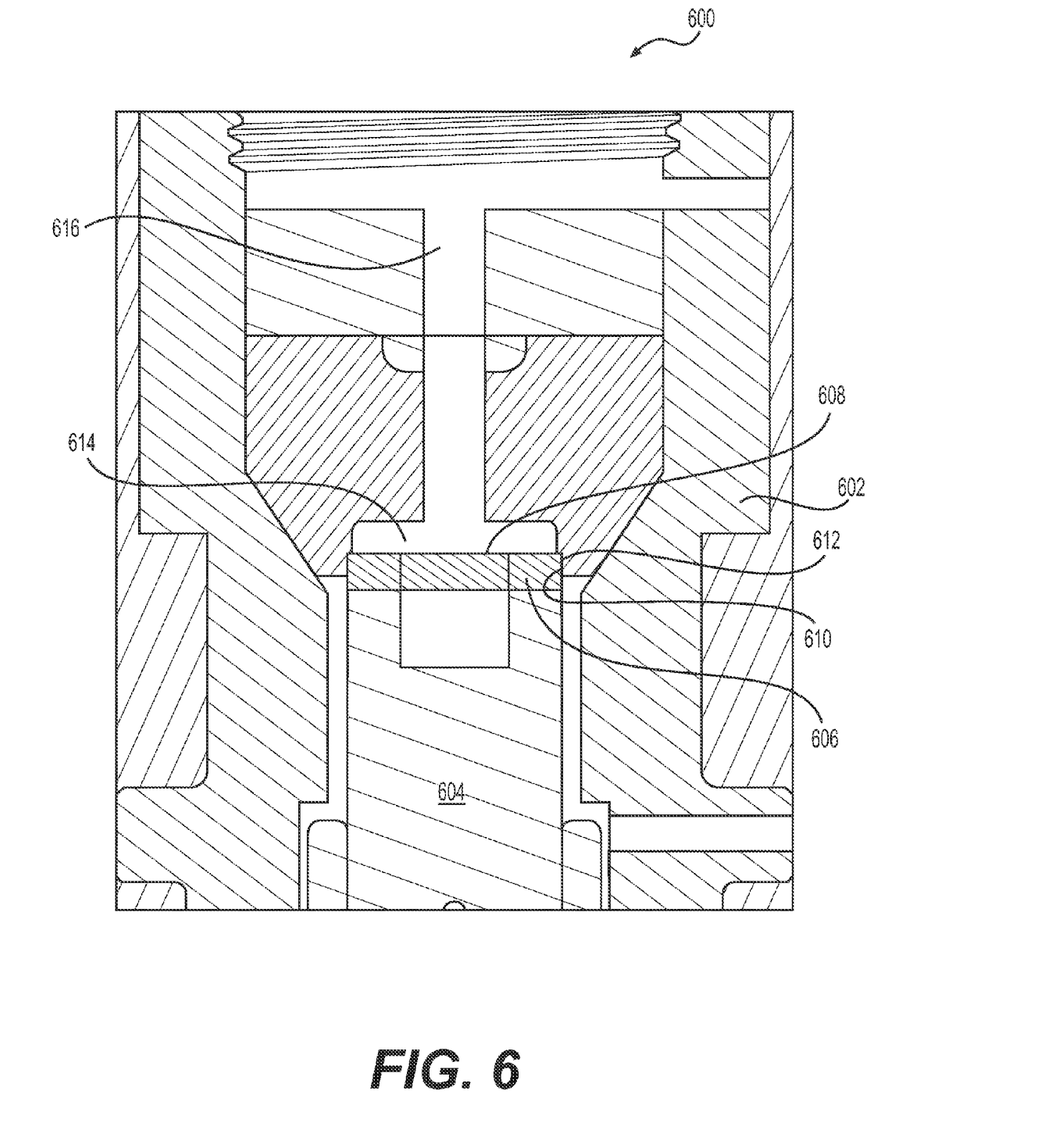
FIG. 6 is a pictorial view of another exemplary disclosed apparatus for performing autofrettage after repairing a damaged area of a relatively flat component.

FIG. 6 illustrates a pictorial view of another exemplary autofrettage tooling setup 600 for performing autofrettage. As illustrated in FIG. 6, tooling setup 600 may include chamber 602 and a piston 604. A component 606 with surface 608 coated with electroless material may be disposed within chamber 602. As illustrated in FIG. 6, piston 604 may exert pressure on component 606 so that edges 610 of component 606 abut sealing surfaces 612 of chamber 602. A gap 614 may remain between surface 608 of component 606 and chamber 602. Tooling setup 600 may also include passageway 616, which may help introduce autofrettage liquid into gap 614 of tooling setup 600. In use, pressurized autofrettage liquid may be introduced into chamber 602 via passageway 616. In one exemplary embodiment, a pressure of the autofrettage liquid may be about 150,000 psi (1 Giga pascal). The autofrettage liquid may apply the autofrettage pressure on coated surface 608 of component 606. The coated surface 608 of component 606 may be exposed to the high pressure for about 0.5 to 1.0 seconds. The pressurized autofrettage liquid may then be slowly drained from chamber 602 via passageway 616. The high pressure applied by the autofrettage liquid on surface 608 may cause plastic deformation of surface 608, which may in turn induce residual compressive stresses in surface 608. It is also contemplated that the pressure exerted by the autofrettage liquid may press some of the electroless material coated on surface 608 into the base material lying below surface 608. In one exemplary embodiment, the autofrettage pressure may push the electroless coating into the base material to a depth ranging from about 0.5 micron to about 1.5 micron.

A method 700 for repairing the nitrided surface 202 will be further described in detail in connection with FIG. 7.

INDUSTRIAL APPLICABILITY

The fuel injection assembly plunger 102 and/or the poppet 308 of the fuel injector assembly 300 may be subjected to damage during operation. The damage may result in unsatisfactory overall performance of the plunger 102 and/or the poppet 308. One solution includes replacing the plunger 102 and/or the poppet 308 by a new one. However this solution poses cost considerations. Other approaches include repairing the damaged area 212 on the nitrided surface 202 of the plunger 102 and/or the poppet 308. Many surface repairing methods such as thermal processes, plating processes and other deposition methods are known in the art.

Thermal repairing processes like micro arc welding, laser beam cladding, etc. may have an effect on surface properties of the repaired surface. During the nitriding process, nitrogen gas is diffused into the surface of the base material, to form a coated base material. The base materials used in the manufacture of the machine components include steel, iron, titanium, and the like. The thermal processes are carried at relatively higher temperatures, causing the out-gassing of nitrogen from the coated base material.

For example, in laser or welding based cladding processes, due to high heat input from the cladding processes the temperature attained at the coated base material is higher than the temperature at which nitriding process is performed. As a consequence, the diffused nitrogen is released from the coated base material, leading to the formation of pores. This may reduce the surface hardness of the base material nitrided surface and also cause porosity in the coated layer.

Further, the known plating process, such as chrome plating, may provide a surface with relatively lesser hardness. This may be undesirable due to the harsh working environment conditions that the machine components are generally subjected to. The lesser hardness may impact the tendency of these components of being susceptible to damage. Other deposition processes like HVOF provide negligible metallurgical bonding between the coating and the base material.

The present disclosure relates to the method 700 of repairing the damaged area 212 on the nitrided surface 202 of the plunger 102 and/or the poppet 308 by using electroless process. The method 700 may be carried out at relatively lower temperatures, preventing the out-gassing of nitrogen from the nitrided surface 202. Additionally, the method 700 does not require electric current, resulting in uniform and continuous coating on the nitrided surface 202. The electroless coating may provide a relatively high bond strength of about 40,000-60,000 psi on steel. Further, the method 700 provides for the resultant surface hardness in a range of approximately 60-70 HRC. This may be a desired hardness required for the machine component to be less susceptible to damage.

Figure 7:
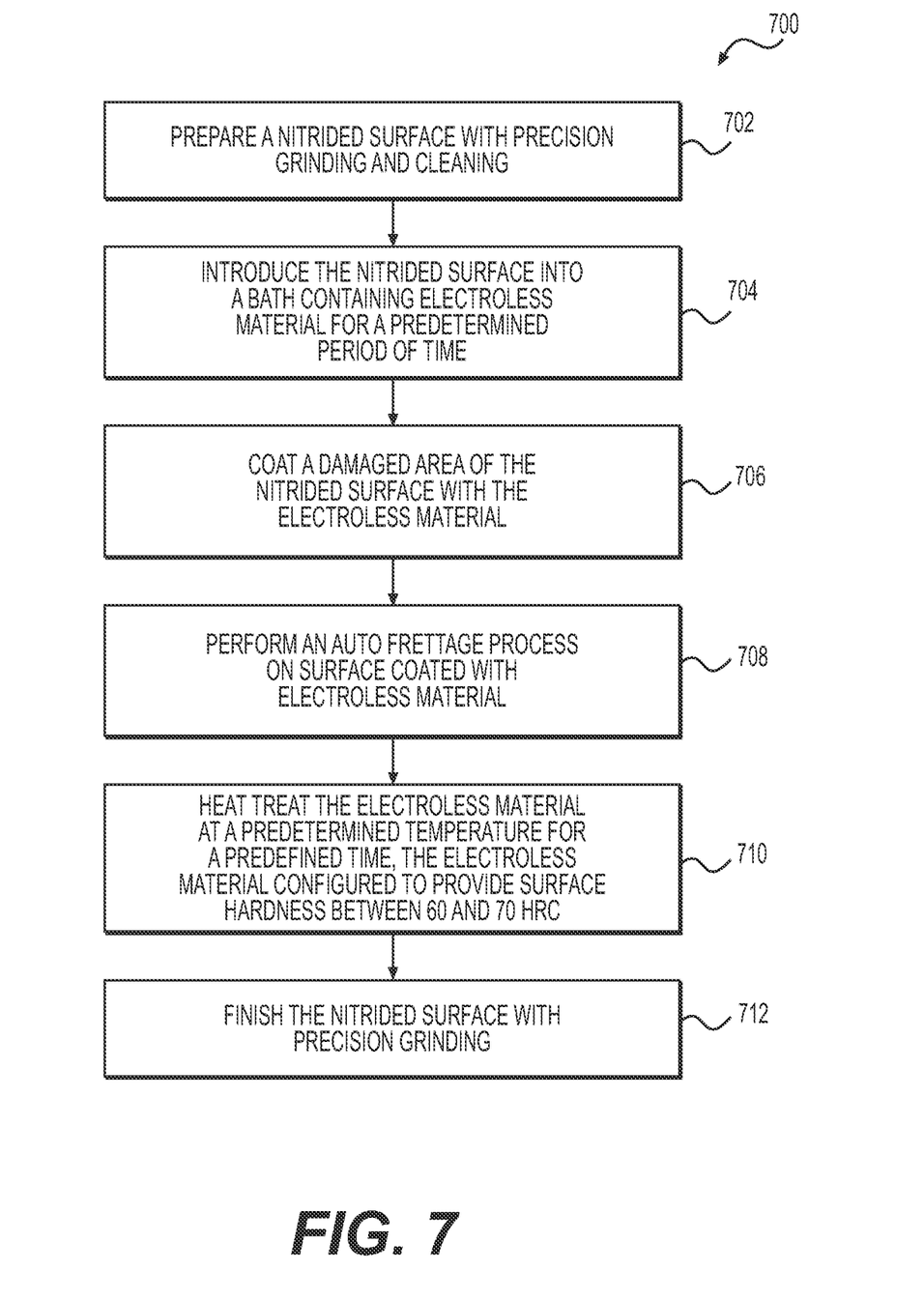
FIG. 7 is a flowchart of an exemplary method for repairing the damaged area on the nitrided surface.

FIG. 7 shows the method 700 for repairing the nitrided surface 202. Initially at step 502, the nitrided surface 202 of the plunger 102 and/or the poppet 308 having the damaged area 212 may be subjected to a pre-treatment process. During pre-treatment, the nitrided surface 202 may be cleaned by any standard cleaning process known in the art. This cleaning process may be washing, polishing, precision grinding, wiping, rinsing, chemical treatment or any combination thereof. For example, the damaged area 212 may be precision ground with a tool like a precision grinding wheel in order to remove any irregularities and level-out the nitrided surface 202.

In one embodiment, remaining areas of the nitrided surface 202 of the plunger 102 and/or the poppet 308, i.e. damage-free areas or areas which do not require coating, may be masked or covered with a polymer mask or any other suitable material mask. The masking may involve tying of a cloth or a polymeric sheet on exposed areas of the nitrided surface 202 by mechanical fasteners like bands, on a temporary basis, until the method 700 is completed. The masking or covering may prevent deposition of electroless material on the damage-free area.

At step 704, the nitrided surface 202 may be introduced into a bath of an electroless solution containing ionic Nickel and ionic Phosphorus (1% to 13% Phosphorus) for a predetermined period of time. The bath may include an open vessel containing the electroless solution. In other embodiments other electroless solutions may be used as would be known in the art. At step 706, the electroless material may be coated on the damaged area 212. It should be noted that the predetermined period of time for which the nitrided surface 202 is held in the electroless solution may depend on a thickness of the coating required on the damaged area 212.

During the electroless Nickel coating at step 506, the coating process auto-catalytically deposits Nickel alloyed with Phosphorus (12% by weight) on the nitrided surface 202. For example, electroless nickel coating using sodium hypophosphite as the reducing agent proceeds via the following overall reduction/oxidation reaction:

$$Ni^{2+}+4H_2PO_2^-+H_2O \rightarrow Ni^0\downarrow+3H_2PO_3^-+H^++P\downarrow+3/2H_2\uparrow$$

Equation 1

At step 708, the component with the nitride surface may be introduced into an autofrettage chamber. During the autofrettage process, the chamber may be filled with autofrettage liquid. The autofrettage liquid may be pressurized to a predetermined pressure. In one exemplary embodiment, the predetermined pressure may be about 150,000 psi (1 Giga Pascal). The predetermined pressure may be maintained for a first period of time. In one exemplary embodiment, the first period of time may be about 0.5 to 1.0 seconds. The autofrettage pressure may be gradually reduced to atmospheric pressure. In one exemplary embodiment, the autofrettage pressure may be linearly or non-linearly reduced over a second period of time. In one exemplary embodiment, the second period of time may range from about 1 hour to about 5 hours. Nitrided surface 202 may have a first porosity. Area 212 of surface 202 may have a second porosity different from the first porosity after completion of the autofrettage process.

At step 710, the nitrided surface 202 may be subjected to heat treatment. The heat treatment may increase the hardness imparted by the electroless material on the nitrided surface 202, resulting in hardness of approximately 60 to 70 HRC. In an exemplary case, heat treatment of the nitrided surface 202 of the plunger 102 and/or the poppet 308 may involve baking, wherein there is rise in temperature at the start of the heat treatment and relatively slow decrease in temperature at the end of the heat treatment. This may avoid any micro-cracking in the electroless material coated on the damaged area 212.

The nitrided surface 202 may be heated at a predetermined temperature for a predefined time period. The predetermined temperature at which the nitrided surface 202 is heated is in a range of approximately 200° C. to 400° C. Also, the predefined time for which the nitrided surface 202 is heated lies may be less than 24 hours. One of ordinary skill in the art will appreciate that the predetermined temperature and the predefined time should be selected in such a way that the properties of the nitrided surface 202 is subjected to minimal or no change. More importantly, the predetermined temperature should be low enough in order to prevent the out-gassing of nitrogen from the nitrided surface 202.

At step 712, the nitrided surface 202 may be subjected to machining, wherein after the heat treatment, one or more dimensions of the resultant surface are processed to achieve desired engineering standards. The engineering standards may be engineering dimensions, surface finish, or any other standard which is necessary for the plunger 102 and/or the poppet 308 being repaired to function in the respective working environment. The machining process could be any standard machining process known in the art. The machining process may include polishing, precision grinding, turning, or any other method known in the art.

The present disclosure has been explained with reference to the damaged area 212 present on the plunger 102 and/or the poppet 308. However, the present disclosure does not restrict itself to the nitrided fuel injection plunger 102 and/or the nitrided poppet 308. The nitrided component can include any nitrided element that may be used in standard automobile engine applications or any other industrial application known in the art.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for repairing a nitrided surface having a damaged area, the method comprising:
   introducing the nitrided surface into a bath containing electroless material for a predetermined period of time;
   coating the damaged area with a layer of the electroless material;
   performing an autofrettage process on the layer; and
   heat treating the electroless material at a predetermined temperature for a predefined time.

2. The method of claim 1, wherein the autofrettage process includes:
   disposing the nitrided surface in a chamber;
   introducing autofrettage liquid at a predetermined pressure into the chamber;
   maintaining the predetermined pressure in the chamber for a first period of time;
   reducing the pressure in the bath after the first period of time has elapsed.

3. The method of claim 2, wherein the predetermined pressure is about 150,000 psi.

4. The method of claim 2, wherein the first period of time ranges from 0.5 to 1.0 seconds.

5. The method of claim 2, wherein the pressure in the bath is reduced from the predetermined pressure to an atmospheric pressure over a second period of time different from the first period of time.

6. The method of claim 2, wherein the pressure in the bath is reduced linearly.

7. The method of claim 6, wherein the second period of time ranges from about 1 hour to about 5 hours.

8. The method of claim 1, wherein the electroless material is configured to provide surface hardness between 60 and 70 HRC.

9. The method of claim 1, wherein the electroless material includes at least one of nickel and phosphorus.

10. The method of claim 1 further comprising machining the electroless material to a desired finish after the heat treating.

11. The method of claim 1, wherein the pre-determined period of time for the introduction of the nitrided surface into the bath is based on a thickness requirement of the electroless material.

12. The method of claim 1, wherein the predetermined temperature for the heat treating lies in a range between 290 and 400° C.

13. The method of claim 1, wherein the predefined time for the heat treating is less than 24 hours.

14. The method of claim 1, wherein the nitrided surface includes at least a portion of a plunger for a fuel injection assembly.

15. The method of claim 1, wherein the damaged area includes cavitation damage on the plunger.

16. A plunger for a fuel injection assembly, the plunger comprising:
   an outer nitrided surface having a first hardness, the outer nitrided surface including at least one damaged area; and
   an electroless material coated on the damaged area, the electroless material having a second hardness different from the first hardness, the electroless material having been subjected to an autofrettage process.

17. The plunger of claim 16, wherein the second hardness ranges between 60 and 70 HRC.

18. The plunger of claim 16, wherein the electroless material includes a least one of nickel and phosphorus.

19. The plunger of claim 16, wherein the damaged area includes cavitation damage.

20. The plunger of claim 16, wherein the outer nitrided surface has a first porosity and the electroless material has a second porosity different from the first porosity.

\* \* \* \* \*